United States Patent Office 2,820,020
Patented Jan. 14, 1958

2,820,020

ETHYLENICALLY UNSATURATED UREA COMPOUNDS, METHOD OF MAKING SAME, AND METHODS OF USING SAME

Borivoj Richard Franko-Filipasic, Niagara Falls, N. Y., assignor to Pittsburgh Plate Glass Company, Allegheny County, Pa., a corporation of Pennsylvania No Drawing. Application September 13, 1954
Serial No. 455,799

17 Claims. (Cl. 260—45.4)

This invention relates to resin forming materials and to polymers and interpolymers thereof and it has particular relation to diurea derivatives containing a plurality of $>C=CH_2$ groups and being adapted to react to form valuable coatings and resins.

It has been recognized that valuable resins can be prepared by condensation reactions of urea or related compounds and aldehydes, such as formaldehyde. The reactions involved in forming these products are characterized by liberation of water of reaction which often is difficult to eliminate and which if allowed to remain in the resin may produce cracking or checking or other objectionable effects.

It has also been recognized that valuable resins can be prepared by reaction through addition between monomers, such as styrene, vinyl chloride, vinyl acetate, or the like, and long chain polyesters of glycols and ethylenically unsaturated dicarboxylic acids, such as maleic acid or fumaric acid. These resins were well adapted for forming castings and laminates but were often unsatisfactory for forming surface coatings.

Resins containing active hydrogen atoms, such as alkyd resins, have also been treated with diisocyanates to produce hardening or other modifications of properties brought about apparently by diisocyanate cross-linking action between adjacent molecules.

This invention comprises the preparation of valuable diurea derivatives containing a plurality of N-allyl groups, said derivatives comprising the moiety

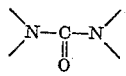

bridged by hydrocarbon groups. These derivatives are represented by alkylene bis(allylureas). The invention further comprises the interpolymerization of the foregoing compounds with polyesters of alpha-beta ethylenically unsaturated dicarboxylic acids to form castings of valuable properties. As a further feature, the invention comprises a novel method of forming such compounds by reaction of a diisocyanate and an allylamine containing an active hydrogen attached to nitrogen.

It is to be understood that the present invention is not limited to any specific method of forming alkylene bis-(alkeneurea) compounds. A convenient method, however, of forming such compounds comprises reacting a diisocyanate, for example, hexamethylene diisocyanate, with an amine containing ethylenic groups ($>C=CH_2$ groups) in terminal position. Diisocyanates suitable for use in the practice of the invention preferably contain from about 4 to about 10 carbon atoms in an aliphatic straight or branched chain; polymethylene diisocyanates, such as hexamethylene diisocyanate, are emphasized. The use of diisocyanates containing aromatic nuclei and being represented by 2,4-tolylene diisocyanate is not precluded, through presently it is not preferred. The derivatives of the diisocyanates and the amines may be represented by the following formula:

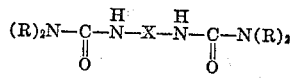

X is hydrocarbon, e. g. aromatic such as tolylene or preferably polymethylene. In the foregoing formula, the groups R may be like or unlike. They, at least in part, contain $>C=CH_2$ portions. In most instances, all four of the groups R will answer to these specifications and may for example be allyl-($CH_2CH=CH_2$). The compounds may be termed N-polymethylene bis(N',N'-diallylurea). The allyl groups can contain replacements for hydrogen, such as ethyl, methyl, chlorine or the like. As previously indicated, a preferred method of preparing the compounds represented in the foregoing formula comprises reacting a diisocyanate, such as hexamethylene diisocyanate, with diallylamine. The reaction can occur without catalysts and at or near room temperature, though slight warming is not precluded.

The alkylene bis(alkeneureas), such as hexamethylene bis(diallylurea), are susceptible of homopolymerization and may be dissolved in suitable media, spread and baked to hard, flexible, adherent state. As previously intimated, they may also be mixed as monomers with polyesters of alpha-beta ethylenic dicarboxylic acids, such as maleic acid, fumaric acid or itaconic acid, and glycols, such as propylene glycol or diethylene glycol, and formed into castings, films and the like. The following examples are illustrative of the application of the principles of the invention.

Example I

In accordance with this example, hexamethylene diisocyanate and diallylamine in the proportions of 1 mole of the diisocyanate to 2 moles of the diallylamine were dissolved in acetone and allowed to stand overnight. (The mixture may be warmed, if desired, to promote reaction.) The resultant product was hexamethylene bis-(diallylurea) which was a crystalline solid. This material could be employed for coating purposes and when dissolved in a solvent, such as acetone, xylene, toluene or butyl alcohol, to form a solution of 50 percent solids concentration, could be heated and cured to a hard, flexible, impact resistant state. It was found advisable to incorporate a small amount of polyvinyl butyral (e. g., about 10 percent by weight, based upon the mixture), with the urea derivative for purposes of increasing the viscosity and body of the material. Other compatible resins could be used in a like capacity. The resultant mixture was spread by dipping upon a test panel and cured for 10 minutes at 400° F. The films, when tested, were found to be of good hardness (Sward 44), good impact resistance, good resistance to the action of alkali and of high flexibility. This is an unusual combination of valuable properties.

Example II

In accordance with this example, hexamethylene bis-(diallylurea) was prepared as in the previous example. This material was employed as a monomer with a polyester of a mixture of propylene glycol and an acid mixture comprising 4 parts of maleic acid and 1 part of terephthalic acid (parts as employed herein were upon a molar basis). In order to mix the polyester and the hexamethylene bis(diallylurea) both components were melted to render them fluid. The interpolymerizable mixture comprised 50 parts by weight based upon the mixture of the polyester and an equal amount upon a like basis of the hexamethylene bis(diallylurea) and 1 percent by weight of tertiary butyl perbenzoate, the latter constituting a catalyst of the reaction and could be replaced by other well known polymerization catalysts. The mixtures were poured into molds and gelled at temperatures initially of approximately 200° F. and ultimately were cured at about 300° F. in order to attain a Barcol hardness of 44. The castings were obviously of good quality. The resin constitutes a good casting material. If increased stability of the mixture of polyester and polymethylene bis(diallylurea) compounds is desired, an inhibitor, such as hydroquinone, 3-isopropyl catechol or the like, in an amount of about 0.001 to 0.1 (e. g., 0.01) percent by weight based upon the polyester may be added. This may be added to the hot polyester.

*Example III*

This example is a repetition of Example I, but with a stoichiometric equivalency of tetramethylene bis(diallylurea) in place of hexamethylene bis(diallylurea). The product can be used directly as a coating medium or it can be mixed with a polyester, such as the one described in Example I, and employed as a casting material. The curing conditions for the films, as well as the castings, are essentially the same as specified for Example I.

*Example IV*

In accordance with this example, the hexamethylene bis(diallylurea) of Example I is replaced by a molecularly equivalent amount of decamethylene bis(diallylurea). The material is dissolved in a solvent, spread as a film and baked at a temperature of 400° F.

The diallylureas of aromatic diisocyanates can also be prepared by reacting the corresponding aromatic diisocyanate with diallylamine.

*Example V*

React 1 mole of 2,4-tolylene diisocyanate with 2 moles of diallylamine. The reaction can be conducted in mass or in an inert material, such as benzene or toluene. The tolylene bis(diallylurea) was mixed with an equal weight of the polyester of Example II and 1 percent by weight based on the mixture of t-butyl perbenzoate as a catalyst and the mixture was poured in a mold and cured in accordance with the schedule of Example II to a Barcol hardness of 55.

It is to be appreciated that the invention is not limited to the use of the polyester of propylene glycol and the maleic acid-terephthalic acid mixture as employed in the preceding examples. It will be appreciated that other polyesters, such as propylene maleate-phthalate, propylene maleate-adipate, propylene maleate-succinate, etc., may be employed in lieu of the preceding polyester. Also, propylene maleate may be employed. Similarly, the corresponding mixtures of fumaric acid and terephthalic, or phthalic and maleic acid may be used in forming the polyesters. It will be appreciated that in the polyesters, propylene glycol may be replaced by other glycols, such as diethylene glycol or dipropylene glycol. Portions of polyethylene glycol having molecular weights from about 300 to about 2000 may be incorporated in the mixture. Proportions of 10 to about 30 percent by weight based upon the polyester mixture are suggested as being appropriate for the polyethylene glycol component.

The following constitutes a partial list of polyesters from which selection can be made in the several examples of this application.

(1)

| | |
|---|---|
| Maleic acid | 1 mole. |
| Phthalic acid | 0.25 to 10 moles. |
| Propylene glycol | Equivalent to acids.[1] |

(2)

| | |
|---|---|
| Maleic acid | 1 mole. |
| Adipic acid | 0.25 to 10 moles. |
| Propylene glycol | Equivalent to acids.[1] |

(3)

| | |
|---|---|
| Maleic acid | 1 mole. |
| Succinic acid | 0.25 to 10 moles. |
| Propylene glycol | Equivalent to acids.[1] |

(4)

| | |
|---|---|
| Maleic acid | 1 mole. |
| Phthalic acid | 0.25 to 10 moles. |
| Diethylene glycol | Equivalent to acids.[1] |

(5)

| | |
|---|---|
| Fumaric acid | 1 mole. |
| Phthalic acid | 0.25 to 10 moles. |
| Propylene glycol | Equivalent to acids.[1] |

(6)

| | |
|---|---|
| Fumaric acid | 1 mole. |
| Adipic acid | 0.25 to 10 moles. |
| Propylene glycol | Equivalent to acids.[1] |

(7)

| | |
|---|---|
| Itaconic acid | 1 mole. |
| Phthalic acid | 0.25 to 10 moles. |
| Propylene glycol | Equivalent to acids.[1] |

(8)

| | |
|---|---|
| Maleic acid | 1 mole. |
| Propylene glycol | 1 mole.[1] |

[1] It is to be understood that the glycol component is often added in slight excess in order to compensate for evaporational losses in the cooking operations involved in the esterification reaction, and to assist in attaining a low acid value.
The acid values of the polyesters will normally be below about 60, e. g., in a range of about 30 to 55, but may be much lower, e. g., 5 or 10, dependent upon requirements.

The polyesters selected from numbers 1 through 8 can be mixed with hexamethylene bis(diallylura) or its equivalent of other bis(diallylurea) derivative and can be cast in a mold and cured at temperatures of about 200° F. to 300° F.

It will be apparent to those skilled in the art that the embodiments of the invention as herein given are by way of illustration and not by way of limitation. Those skilled in the art will appreciate that numerous modifications may be made therein without departure from the spirit of the invention or the scope of the appended claims.

I claim:
1. A N-polymethylene bis(N',N'-allylurea).
2. A N-polymethylene bis(N',N'-diallylurea) in which the polymethylene group contains from about 4 to about 10 carbon atoms.
3. An interpolymerizable mixture of N-polymethylene bis(N',N'-diallylurea) and a polyester of a dihydric alcohol and an alpha-beta ethylenic dicarboxylic acid.
4. An interpolymerizable mixture of a N-polymethylene bis(N',N'-diallylurea) in which the polymethylene group contains from 4 to 10 carbon atoms and a polyester of a dihydric alcohol and a dicarboxylic acid which is alpha-beta ethylenically unsaturated.
5. An interpolymerizable mixture of N-hexamethylene bis(N',N'-diallylurea) and a polyester of a dihydric alcohol and an alpha-beta ethylenic dicarboxylic acid.
6. An interpolymerizable mixture of a N-polymethylene bis(N',N'-diallylurea) and a polyester of dihydric alcohol and a dicarboxylic acid mixture, a part of which is alpha-beta ethylenically unsaturated and the rest of which is free of ethylenic unsaturation.
7. A mixture as defined in claim 6 in which the polymethylene group of the N-polymethylene bis(N',N'-diallylurea) contains from 4 to 10 carbon atoms.
8. The interpolymerizable mixture of claim 6 in which the N-polymethylene bis(N',N'-diallylurea) is N-hexamethylene bis(N',N'-diallylurea).
9. As a new composition of matter a N-polymethylene bis(N',N'-diallylurea) dissolved in a solvent.
10. A method of coating a surface which comprises applying thereto a film of a N-polymethylene bis(N',N'-diallylurea) in a solvent medium and baking the same to a hard, flexible, durable state.
11. A method as defined in claim 10 in which the

N-polymethylene bis(N′,N′-diallylurea) is N-hexamethylene bis(N′,N′-diallylurea).

12. A method of forming a N-polymethylene bis(N′,N′-diallylurea) which comprises mixing a polymethylene diisocyanate with diallylamine.

13. A method of forming hexamethylene bis(diallylurea) which comprises mixing hexamethylene diisocyanate with diallylamine.

14. As a new material a polymer of N-polymethylene bis(N′,N′-diallylurea).

15. A method of forming a N-diallyldiurea which comprises reacting diallylamine with a diisocyanate of a saturated hydrocarbon containing 4 to 10 carbon atoms.

16. As a new material a compound of the formula:

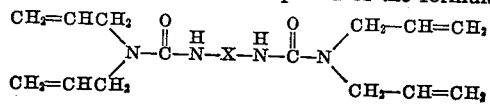

where X is a saturated hydrocarbon containing 4 to 10 carbon atoms.

17. As a new material a compound of the formula:

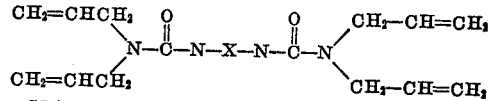

where X is polymethylene.

References Cited in the file of this patent

FOREIGN PATENTS

| | | |
|---|---|---|
| 506,809 | Belgium | Nov. 14, 1951 |
| 67,192 | Norway | July 31, 1942 |